(12) United States Patent
Lanigan et al.

(10) Patent No.: US 9,734,094 B2
(45) Date of Patent: Aug. 15, 2017

(54) COMPUTER SECURITY SYSTEM AND METHOD

(71) Applicant: INVASEC LIMITED, London, Greater London (GB)

(72) Inventors: Christopher Lanigan, London (GB); Michael Lampe, London (GB); Steven Whitchurch, Milton Keynes (GB); Glenn Lynn, Grantham (GB); Scott Alexander, Milton Keynes (GB)

(73) Assignee: INVASEC LIMITED, London (GB)

( * ) Notice: Subject to any disclaimer, the term of this patent is extended or adjusted under 35 U.S.C. 154(b) by 0 days.

(21) Appl. No.: 15/304,681

(22) PCT Filed: Apr. 13, 2015

(86) PCT No.: PCT/GB2015/051114
§ 371 (c)(1),
(2) Date: Oct. 17, 2016

(87) PCT Pub. No.: WO2015/159055
PCT Pub. Date: Oct. 22, 2015

(65) Prior Publication Data
US 2017/0039146 A1    Feb. 9, 2017

(30) Foreign Application Priority Data

Apr. 17, 2014 (GB) .................................. 1406995.9

(51) Int. Cl.
*G06F 12/14* (2006.01)
*G06F 21/55* (2013.01)
(Continued)

(52) U.S. Cl.
CPC ...... *G06F 12/1408* (2013.01); *G06F 13/4282* (2013.01); *G06F 21/554* (2013.01);
(Continued)

(58) Field of Classification Search
None
See application file for complete search history.

(56) References Cited

U.S. PATENT DOCUMENTS

| 7,490,350 | B1 | 2/2009 | Murotake et al. |
| 2004/0268147 | A1 | 12/2004 | Wiederin et al. |

(Continued)

FOREIGN PATENT DOCUMENTS

| CN | 201465116 | 5/2010 |
| EP | 2 237 180 | 10/2010 |

(Continued)

OTHER PUBLICATIONS

GB Search Report dated Oct. 22, 2014, from related application No. 1406995.9.

(Continued)

*Primary Examiner* — Kaveh Abrishamkar
(74) *Attorney, Agent, or Firm* — Foley & Lardner LLP

(57) ABSTRACT

A computer security system and method comprises a security device (1) which incorporates a connection arrangement (12i) which is configured to be connected to a communication port of a computer (2). The security device (1) comprises a communication module (14) which is configured to communicate data between the security device (1) and a remote management device (5). The security device (1) further comprises a control unit (13) which is configured to control remote data communication between the communication port of the computer (2) and the remote management device (5) via the connection arrangement (12) and the communication module (14). The control unit (13) is configured to enable the remote data communication in response to an authorization signal received from the remote management device (5) and the control unit (13) is configured to disable the remote data communication when the control (Continued)

Figure 1:
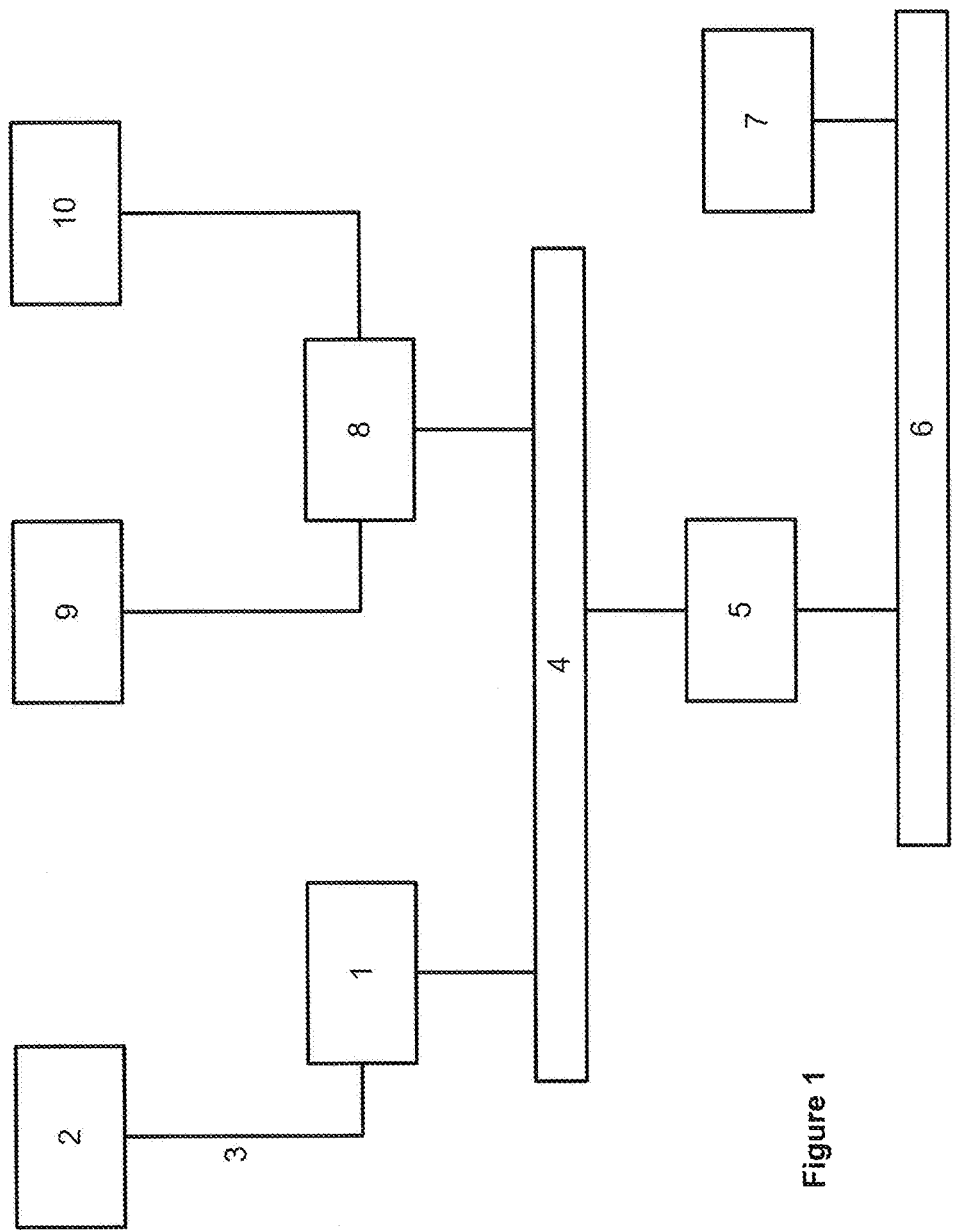

unit (13) is not authorized by a signal from the remote management device (5).

33 Claims, 4 Drawing Sheets

(51) Int. Cl.
    *G06F 21/56*     (2013.01)
    *G06F 21/79*     (2013.01)
    *G06F 21/85*     (2013.01)
    *H04L 29/06*     (2006.01)
    *G06F 13/42*     (2006.01)

(52) U.S. Cl.
CPC ............ *G06F 21/567* (2013.01); *G06F 21/79* (2013.01); *G06F 21/85* (2013.01); *H04L 63/0428* (2013.01); *H04L 63/06* (2013.01); *H04L 63/1416* (2013.01); *H04L 63/1425* (2013.01); *H04L 63/168* (2013.01); *H04L 63/18* (2013.01); *G06F 2212/1052* (2013.01)

(56) References Cited

U.S. PATENT DOCUMENTS

| | | | |
|---|---|---|---|
| 2007/0156850 A1 | 7/2007 | Corrion | |
| 2009/0285166 A1* | 11/2009 | Huber | G06Q 20/1235 |
| | | | 370/329 |
| 2011/0093958 A1* | 4/2011 | Devictor | G06F 21/6218 |
| | | | 726/26 |
| 2011/0185417 A1* | 7/2011 | Zhou | G06F 21/566 |
| | | | 726/22 |
| 2013/0174214 A1* | 7/2013 | Duncan | G06F 11/3065 |
| | | | 726/1 |
| 2014/0108799 A1* | 4/2014 | Wang | G06F 21/32 |
| | | | 713/168 |
| 2016/0094578 A1* | 3/2016 | McQuillan | H04L 63/1433 |
| | | | 726/23 |
| 2017/0039146 A1* | 2/2017 | Lanigan | G06F 21/554 |

FOREIGN PATENT DOCUMENTS

| | | |
|---|---|---|
| EP | 2 672 414 | 12/2013 |
| GB | 2 525 248 | 6/2016 |

OTHER PUBLICATIONS

International Search Report and Written Opinion dated Jul. 1, 2015, from related application No. PCT/GB2015/051114.
McIntyre, Anne et al. "Host protection strategies for industrial control systems," Homeland Security (HST), 2012 IEEE Conference on Technologies for, IEEE, Nov. 13, 2012, pp. 87-92.
Combined Search and Examination Report dated Oct. 23, 2014, from related application No. 1406995.9.
Notification of Grant dated May 10, 2016, from GB application No. 1406995.9.

\* cited by examiner

COMPUTER SECURITY SYSTEM AND METHOD

The present invention relates to a computer security system and method. The present invention more particularly relates to a system and method for protecting a computer by minimising the possibility of malware being introduced to the computer via a communication port on the computer.

A computer usually incorporates hardware communication ports to enable peripheral devices to be physically connected to the computer by a cable or other connector. One of the most common communication ports is the universal serial bus (USB) port. The following discussion of the prior art focuses on USB ports but it is to be appreciated that computers with other types of communication port can suffer from the same problems as computers with USB ports.

A computer is usually configured to enable a USB mass storage device, such as a hard drive, flash drive or memory stick to be connected to the computer via a USB port. The computer mounts the mass storage device as a disc within the operating system of the computer so that the operating system can access data stored on the mass storage device.

A problem can arise if a mass storage device which is infected with malware is inserted into the USB port of a computer since the computer can become infected with the malware.

It has been proposed previously to install an antivirus system on a computer to scan the data stored in a mass storage device as soon as the mass storage device is connected to the computer. However, the success of this arrangement relies on the definitions used by the antivirus system being kept up to date in order for the system to detect new forms of malware. It can be difficult to ensure that the definitions of an antivirus system are always up to date, particularly on a computer which is not connected to the Internet. Furthermore, older computer systems running outdated operating systems are often incapable of running current antivirus software that can identify the latest malware strains. Such outdated computer systems are still in use in many industrial plants which operate using proprietary control software which is only configured for use on an older computer system.

A computer port, such as a USB port, communicates with the connected computer hardware on a relatively low level. Therefore, it is possible for a computer to be infected with malware via a communication port at a low level, before antivirus software running at a higher level is able to scan a device connected to the communication port.

It can also be difficult to implement a malware scanning system on an industrial control system, such as an industrial supervisory control and data acquisition (SCADA) system. It is often impossible to install an anti-malware system on a SCADA system since the functionality of a SCADA system is usually locked down to maximise the security and reliability of the system.

An industrial control system, such as a SCADA system is, however, still vulnerable to malware infection via a hardware communication port, such as a USB port provided on the system. There are documented reports of industrial control systems being compromised by malware which is designed to operate on a low level to disrupt an industrial control system. One example of this type of malware is the Stuxnet computer worm that was designed to disrupt a system for controlling industrial centrifuges.

It has been proposed to install authorisation software on a computer system so that the authorisation software is activated as soon as a mass storage device is connected to the computer system, before the operating system mounts the mass storage device. The authorisation software only permits the operating system to mount the mass storage device if the authorisation software identifies that the mass storage device has been previously checked and authorised. In one conventional arrangement, a mass storage device must be scanned for malware and authorised by a separate secure system before the authorisation software will permit the mass storage device to be mounted by the operating system of the computer. This conventional arrangement helps to minimise the possibility of an unauthorised mass storage device being mounted by an operating system. However, the problem with this conventional arrangement is that it cannot be used with older computer systems or industrial control systems which are incapable of running the required authorisation software.

There is a need for a system and method for protecting a computer system, such as an industrial control computer system from infection via a hardware communication port.

According to one aspect of the present invention there is provided a security system for protecting a computer, the system comprising a security device which comprises a connection arrangement which is configured to be connected to a communication port of a computer, a communication module which is configured to communicate data between the security device and a remote management device, and a control unit which is configured to control remote data communication between the communication port of the computer and the remote management device via the connection arrangement and the communication module, wherein the control unit is configured to enable the remote data communication in response to an authorisation signal received from the remote management device and the control unit is configured to disable the remote data communication when the control unit is not authorised by a signal from the remote management device.

Preferably, the connection arrangement comprises a universal serial bus (USB), Lightning®, Firewire®, Ethernet, eSATA or Thunderbolt® connector which is configured to be connected to a USB, Lightning®, Firewire®, Ethernet, eSATA or Thunderbolt® port of a computer.

Conveniently, the security device comprises a persistent memory storing machine readable instructions for execution by the control unit during the operation of the security device, and wherein the security device does not incorporate a mass storage device.

Advantageously, the persistent memory stores machine readable instructions which, when executed by the control unit, function as an operating system which controls the security device.

Preferably, the persistent memory stores machine readable instructions which, when executed by the control unit, perform the function of a pre-execution environment (PXE) which obtains machine readable instructions stored on the remote management device which, when executed by the control unit, perform the function of an operating system which controls the security device.

Conveniently, the security device is configured to prevent data which has not been authorised by the remote management device from being stored in a persistent memory in the security device.

Advantageously, the persistent memory in the security device is configured to store cached files provided by the remote management device.

Preferably, the remote management device is configured to encrypt the cached files using a temporary session key and the security device is configured to decrypt the files using the temporary session key.

Advantageously, the system comprises a remote management device and the remote management device comprises a persistent data storage arrangement which is configured to store data to be communicated to the security device during the remote data communication.

Preferably, the remote management device is configured to present the stored data to the security device during the remote data communication.

Conveniently, the remote management device is configured to provide an elastic data storage system which allocates a portion of the persistent data storage arrangement to store data to be communicated with the security device.

Advantageously, the remote management device comprises a malware scanning module which is configured to scan data stored in the persistent data storage arrangement for malware.

Preferably, the security device is configured to transmit a malware file or an infected data file to the remote management device to be scanned by the malware scanning module.

Preferably, the remote management device comprises a monitoring arrangement which is configured to monitor the status of the security device.

Conveniently, the monitoring arrangement is configured to periodically transmit a status request signal to the security device, the security device being configured, in response to the status request signal, to transmit a status signal to the monitoring arrangement which is indicative of a status of the security device.

Advantageously, the monitoring arrangement is configured to generate an alert signal if the monitoring arrangement does not receive a status signal from the security device within a predetermined time period.

Preferably, the remote management device is configured to store a whitelist of data files that are authorised for transmission to the security device.

Conveniently, the remote management device is configured to store a secure identifier for each whitelisted data file and to transmit the secure identifier to the security device with each whitelisted data file.

Advantageously, the remote management device is configured to provide an image file to the security device, the image file comprising a plurality of whitelisted data files.

Preferably, the remote management device is configured to encrypt the image file and the security devices is configured to decrypt the image file using a decryption key provided by the remote management device.

Advantageously, the communication module is configured to encrypt data communicated to the remote management device and to decrypt data received from the remote management device.

Preferably, the security device is configured to at least partly switch off when the connection arrangement is disconnected from the communication port of the computer.

Conveniently, the computer is a supervisory control and data acquisition (SCADA) system.

Advantageously, the system comprises a plurality of security devices which are each configured to communicate with at least one remote management device.

Preferably, the system comprises a computer which incorporates a plurality of communication ports and one of the security devices is connected to each one of the plurality of communication ports.

According to another aspect of the present invention, there is provided a method of securing a computer which comprises at least one communication port, the method comprising providing a remote management device, providing at least one security device, each security device comprising a connection arrangement which is configured to be connected to a communication port of the computer, a communication module which is configured to communicate data between the security device and the remote management device, and a control unit which is configured to control remote data communication between the communication port of the computer and the remote management device via the connection arrangement and the communication module, connecting the connection arrangement of the security device to a communication port of the computer, wherein the method further comprises transmitting an authorisation signal from the remote management device to the or each security device, enabling the remote data communication at the security device in response to the received authorisation signal, and disabling the remote data communication when the or each security device is not authorised by a signal from the remote management device.

Preferably, the method further comprises providing a plurality of security devices and connecting each of the security devices to a respective communication port of the computer.

Conveniently, the connection arrangement comprises a universal serial bus (USB), Lightning®, Firewire®, Ethernet, eSATA or Thunderbolt® connector which is configured to be connected to a USB, Lightning®, Firewire®, Ethernet, eSATA or Thunderbolt® port of a computer.

Advantageously, the security device comprises a persistent memory storing machine readable instructions for execution by the control unit during the operation of the security device, and wherein the security device does not incorporate a mass storage device.

Preferably, the persistent memory stores machine readable instructions which, when executed by the control unit, function as an operating system which controls the security device.

Conveniently, the method further comprises storing cached files provided by the remote management device in the persistent memory.

Advantageously, the method further comprises encrypting the cached files at the remote management device using a temporary session key and decrypting the cached files at the security device using the temporary session key.

Conveniently, the persistent memory stores machine readable instructions which, when executed by the control unit, perform the function of a pre-execution environment (PXE) which obtains machine readable instructions stored on the remote management device which, when executed by the control unit, perform the function of an operating system which controls the security device.

Advantageously, the method comprises preventing data which has not been authorised by the remote management device from being stored in a persistent memory in the security device.

Preferably, the remote management device comprises a persistent data storage arrangement which is configured to store data to be communicated to the security device during the remote data communication.

Advantageously, the method comprises allocating at least a portion of the persistent data storage arrangement to store data to be communicated with the security device in an elastic storage system at the remote management device.

Preferably, the remote management device comprises a malware scanning module and the method comprises scanning data stored in the persistent data storage arrangement for malware.

Preferably, the method comprises transmitting a malware file or an infected data file from the security device to the remote management device to be scanned by the malware scanning module.

Conveniently, the method comprises encrypting data communicated to the remote management device and to decrypting data received from the remote management device.

Advantageously, the remote management device comprises a monitoring arrangement and the method comprises monitoring the status of the security device using the monitoring arrangement.

Preferably, the method comprises periodically transmitting a status request signal from the monitoring arrangement to the security device, and transmitting a status signal from the security device in response to the status request signal to the monitoring arrangement which is indicative of a status of the security device.

Conveniently, the method comprises generating an alert signal if the monitoring arrangement does not receive a status signal from the security device within a predetermined time period.

Advantageously, the method comprises storing, at the management device, a whitelist of data files that are authorised for transmission to the security device.

Preferably, the method comprises storing, at the remote management device, a secure identifier for each whitelisted data file and the method comprises transmitting the secure identifier to the security device with each whitelisted data file.

Conveniently, the method comprises providing an image file from the remote management device to the security device, the image file comprising a plurality of whitelisted data files.

Advantageously, the method comprises encrypting the image file at the remote management device and decrypting the image file at the security devices using a decryption key provided by the remote management device.

Conveniently, the method comprises at least partly switching off the security device when the connection arrangement is disconnected from the communication port of the computer.

Advantageously, the computer is a supervisory control and data acquisition (SCADA) system.

Preferably, the method comprises providing a plurality of security devices which are each configured to communicate with the remote management device.

Conveniently, the method comprises connecting one of the security devices to each one of a plurality of communication ports provided on a computer.

Figure 2:
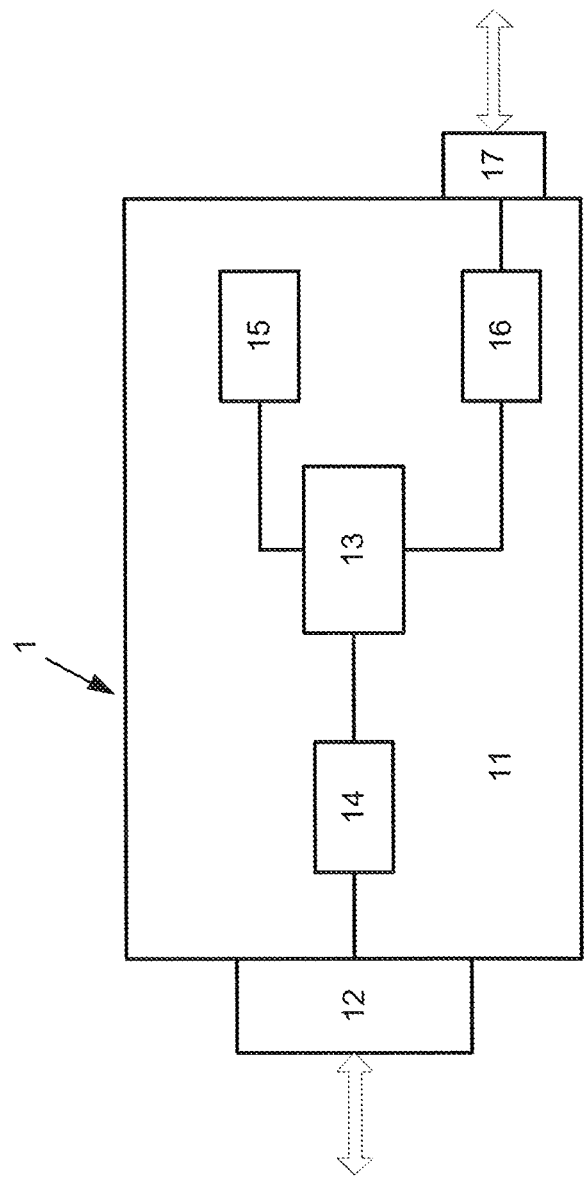
Figure 3:
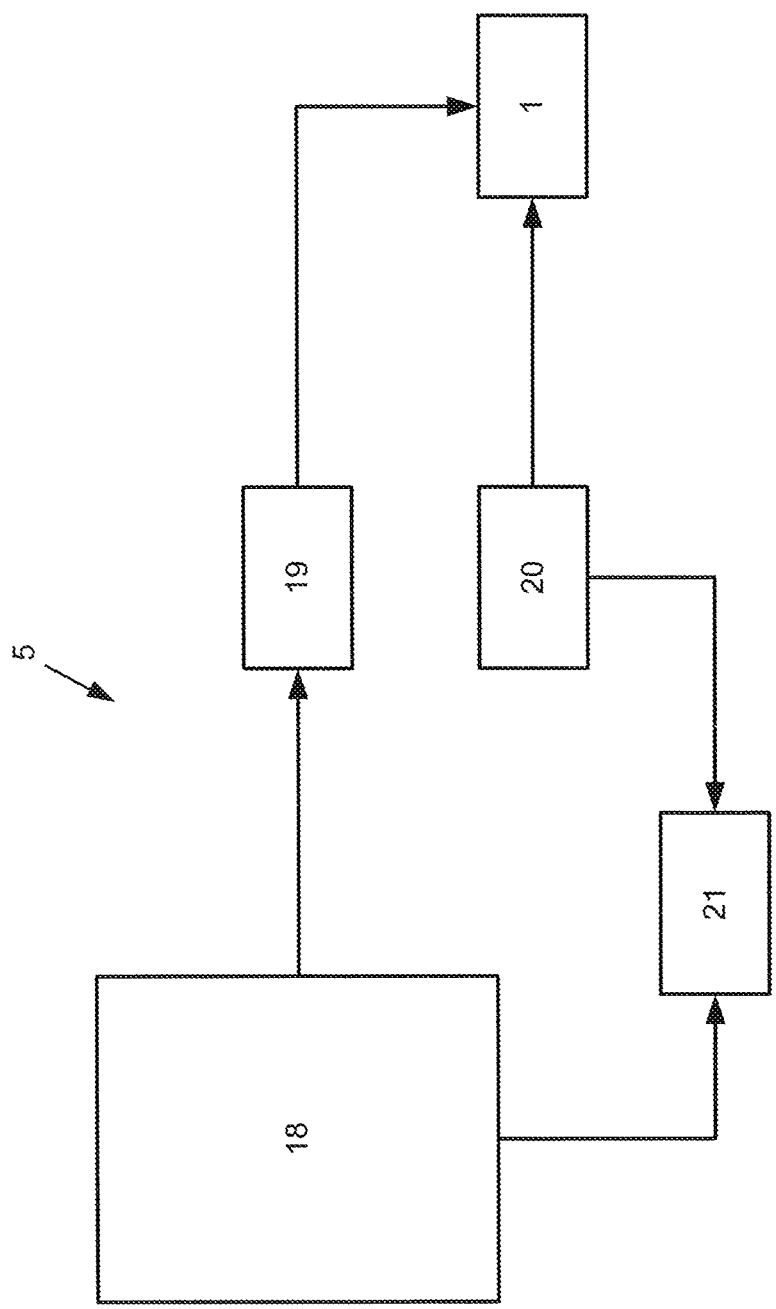
Figure 4:
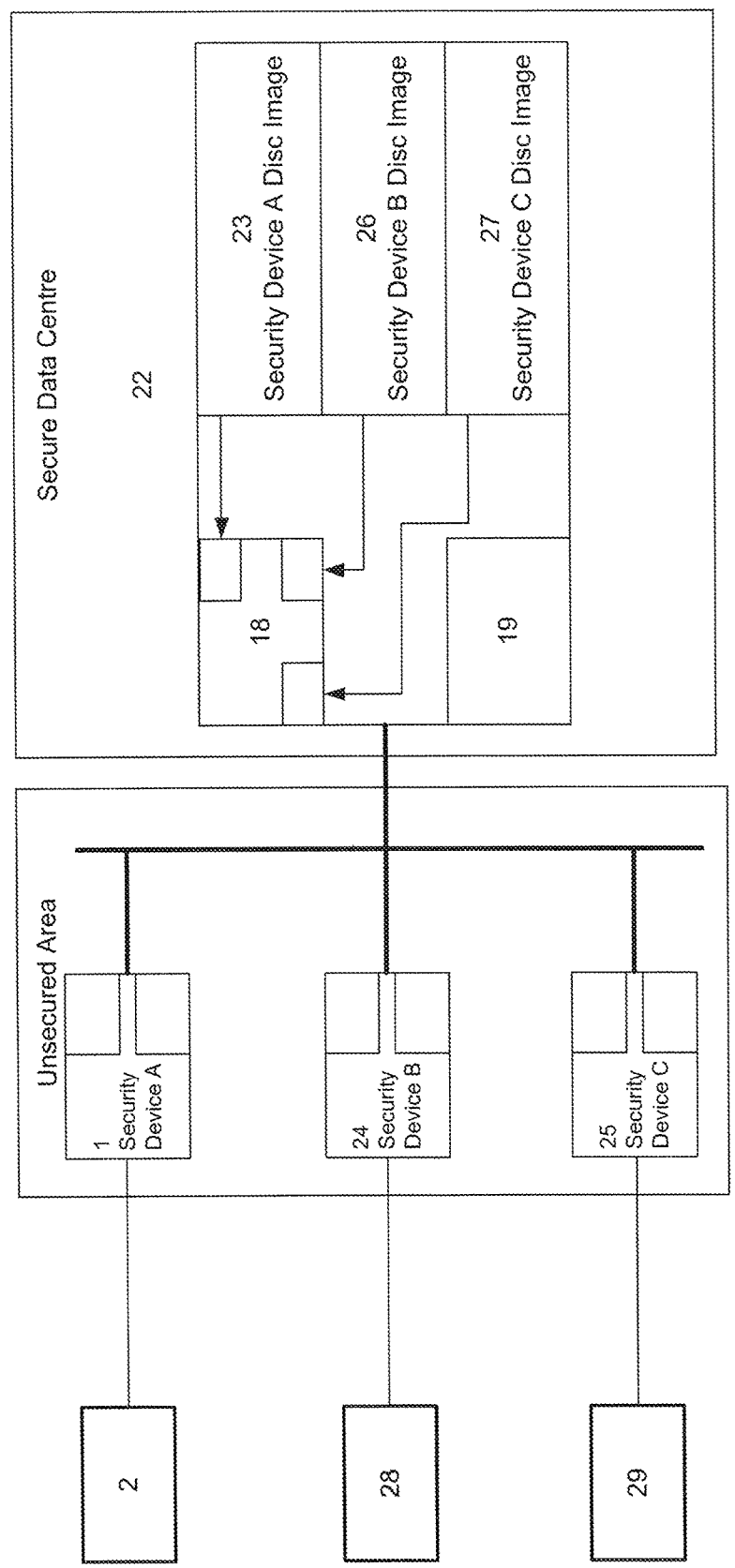

So that the present invention may be more readily understood, embodiments of the present invention will now be described, by way of example, with reference to the accompanying drawings, in which:

FIG. 1 is a schematic diagram showing a high level representation of a security system of an embodiment of the invention, FIG. 2 is a schematic diagram of a security device of an embodiment of the invention, FIG. 3 is a schematic diagram of a management device of an embodiment of the invention, and FIG. 4 is a schematic diagram illustrating the connections between a security device and a management device of an embodiment of the invention.

Referring initially to FIG. 1 of the accompanying drawings, a system for protecting a computer of an embodiment of the invention comprises a first security device 1 which is configured to be connected to a communication port of a computer 2. In this embodiment, the computer 2 is a supervisory control and data acquisition (SCADA) system. However, it is to be appreciated that the computer 2 may be any type of computer which incorporates at least one communication port.

The computer 2 may comprise proprietary hardware for use in an industrial control system which is locked down to restrict the functionality of the computer to the particular tasks that it is required to perform. The computer 2 may therefore be a computer which is not capable of running current anti-malware or antivirus software. The computer 2 may be outdated computer which is running an old operating system that is needed to run proprietary controls software. The computer 2 may alternatively be a computer terminal in a corporate setting, such as an office or a financial institution.

The computer 2 comprises at least one hardware communication port. In most cases, the computer 2 will incorporate a plurality of hardware communication ports. Each of the communication ports is configured to connect to a peripheral device. One such peripheral device may be a mass storage device which stores data to be accessed by the computer when the device is connected to the computer. A mass storage device is a device which is configured to store data in a persistent data storage arrangement. Mass storage devices include at least hard drives, flash drives or memory sticks which may be capable of storing large volumes of data in excess of 500 megabytes, one gigabyte or more than one terabyte.

The communication port of the computer may be any type of hardware communication port. The security device 1 comprises a connection arrangement which is configured to be connected to a compatible communication port of the computer 2. The connection arrangement in an embodiment of the invention may be configured to connect to a communication port selected from a group consisting of universal serial bus (USB), Lightning®, Firewire®, ethernet, eSATA or Thunderbolt®. It is, however, to be appreciated that a system of other embodiments of the invention comprises a security device with a connection arrangement which is configured to be connected to any type of computer communication port which is able to transfer data to or from a computer.

In a preferred embodiment of the invention, the security device 1 comprises a connection arrangement in the form of a USB connector which is configured to be connected to a USB port of a computer.

A connection 3 is illustrated schematically in FIG. 1 between the security device 1 and the computer 2. In embodiments of the invention, the connection 3 may be a direct connection between a USB connector on the security device 1 and a USB port on the computer 2. For instance, in one embodiment, the USB connection arrangement is provided directly on the outer casing of the security device 1 for direct connection to a USB port on the computer 2. However, in other embodiments, the USB connection arrangement on the security device 1 is connected to the USB port on the computer 2 via an intermediate connection arrangement, such as a cable.

The security device 1 is connected via a computer network 4, preferably in the form of an isolated LAN/VLAN, to a remote management device 5. The management device 5 is remote from the security device 1 in the sense that the management device 5 is not connected directly to the security device 1 or housed within a housing of the security device 1. The management device 5 is preferably connected to the security device 1 via a computer network. The management device 5 may be situated in the same building as the security device 1 or in a different building which is remote from a building where the security device 1 is located.

The management device 5 is, in this arrangement, connected to a corporate computer network 6. At least one further computer 7 is also connected to the computer network 6.

A further security device 8 is, in this arrangement, also connected to the computer network 4. The further security device 8 is connected to communication ports of two further computers 9, 10. For simplicity purposes, the description below will specify only the first security device 1 which is connected to the first computer 2.

Referring now to FIG. 2 of the accompanying drawings, the security device 1 comprises a housing 11 which houses the components of the security device 1.

The security device 1 comprises a connection arrangement which, in this embodiment, is in the form of a male USB connector 12. The USB connector 12 is mounted to the housing 11 so that the housing 11 is positioned immediately adjacent the casing of the computer 2 when the USB connector 12 is inserted into a USB port of the computer 2. It is to be appreciated that the arrangement of the USB connector 12 and the housing 11 prevents a further USB connector from being inserted into or forming a data connection with the USB port on the computer 2. The security device 1 therefore blocks other devices from being connected to the USB port of the computer 2.

The security device 1 comprises a control unit which, in this embodiment, is in the form of a processor 13. The processor 13 is operable to execute machine readable instructions to provide an operating system which controls the components of the security device 1.

The processor 13 is connected to a data transfer module 14 which is also connected to the USB connector 12. The data transfer module 14 is operable to transfer data between the USB connector 12 and the processor 13 in accordance with the communication protocol of the communication port of the computer 2 which, in this case, is the USB protocol.

The security device 1 incorporates a persistent memory 15 which is connected to the processor 13. The persistent memory 15 stores machine readable instructions which are executed by the processor 13. In one embodiment, the machine readable instructions stored by the persistent memory 15 are instructions which, when executed by the processor 13, provide the function of an operating system within the security device 1.

In a preferred embodiment of the invention, the security device 1 does not incorporate persistent memory which functions as a mass storage device. The persistent memory 15 is preferably only for storing machine readable instructions to be executed by the processor 13 to control the security device 1 and not data for use by the computer 2. The security device 1 is preferably configured to prevent unauthorised data from being stored in the persistent memory 15.

In a further embodiment, the persistent memory 15 only stores machine readable instructions which, when executed by the processor 13 perform the function of a pre-execution environment (PXE). The PXE accesses machine readable code stored at a remote location which, when executed, by the processor 13 performs the function of an operating system within the security device 1.

The security device 1 comprises a communication module 16 which is connected to the processor 13. The communication module 16 is configured to communicate data between the security device 1 and the management device 5. In a preferred embodiment of the invention, the communication module 16 is configured to encrypt data sent to the management device 5 and to decrypt data received from the management device 5. The data is preferably encrypted using secure shell (SSH) encryption.

In a preferred embodiment, the communication module 16 is connected to a communication port 17 on the security device 1 which is configured to be connected to the computer network 4. The communication port 17 is preferably a wired communication port, such as an ethernet port which enables data to be communicated between the security device 1 and the management device 5 via the computer network 4. In a further embodiment of the invention, the communication port 17 is a wireless communication port which is configured to communicate data wirelessly between the security device 1 and the management device 5.

Referring now to FIG. 3 of the accompanying drawings, the management device 5 is preferably in the form of a computer server or other computing device which incorporates a central processing unit, memory and a data storage system. The management device 5 comprises an operating system which is, in this preferred embodiment is a Linux operating system 18. The management device 5 comprises an encryption/decryption module 19 which is configured to encrypt and decrypt data communicated between the management device 5 and the security device 1. The encryption/decryption module 19 is preferably a module which is configured for SSH encrypted communication. However, other encryption techniques familiar to those skilled in the art may be used to encrypt data communicated between the security device 1 and the management device 5.

The management device 5 comprises a monitoring arrangement 20 which is configured to monitor the status of the security device 1. The monitoring arrangement 20 is configured to monitor the status of the security device 1 by periodically transmitting status request signals to the security device 1. The security device 1 is operable to transmit a status signal to the monitoring arrangement 20 in response to each status request signal.

The management device 5 is configured to store monitoring data output from the monitoring arrangement 20 in a database 21. The operating system 18 is configured to read the monitoring data stored in the database 21 to determine the current status of the security device 1.

The monitoring arrangement 20 is configured to generate an alert signal if the monitoring arrangement 20 does not receive a status signal from the security device 1 within a predetermined time period. The security device 1 will not transmit a status signal if the security device 1 is powered down, for instance when the security device 1 is removed from the communication port of the computer 2. Therefore, the monitoring arrangement 20 is able to detect when a security device 1 is removed from the computer 2 or if the security device 1 is disabled. The alert signal generated by the monitoring arrangement 20 is preferably output to a technician who can inspect the computer 2 to determine why the security device 1 has been removed or disabled.

The management device 5 is configured to restrict access to the security device 1 in response to the alert signal since the alert signal indicates that tampering has occurred. The data stored within the management device 5 is thus not compromised by tampering to the computer 2 or the security device 1 since the data is stored securely at the remote management device 5.

In a further embodiment, the security device 1 incorporates a watchdog notification arrangement which is configured to transmit a status signal to the remote management device 5 periodically. The management device 5 is preferably configured to send a response signal to the security device 1 in response to each status signal to confirm that the communication channel between the devices is functioning correctly.

Referring now to FIG. 4 of the accompanying drawings, the management device 5 is preferably located in a secure facility, such as a secure data centre. The management device 5 incorporates a persistent data storage arrangement 22 which is configured to store data to be accessed by the security device 1. The management device 5 is configured to store a disc image 23 that is allocated by the management device 5 to the security device 1 from a portion of the data storage arrangement 22.

When the security device 1 is connected to a communication port of a computer 2, the security device 1 is powered up by power from the communication port of the computer 2. The processor 13 executes operating system code stored within the persistent memory 15 to control the operation of the security device 1. Alternatively, in further embodiments which do not store an operating system in the persistent memory 15, the processor 13 executes PXE code to retrieve operating system code from the management device 5 for execution by the processor 13.

The operating system within the security device 1 interfaces with the computer 2 via the communication port. In the preferred embodiment, the security device 1 is configured to be seen by the computer 2 as a USB mass storage device which is mounted as a disc image within the operating system of the computer 2. The processor controls remote data communication between the USB port 12 of the computer 2 and the management device 5 via the USB port 12 and the communication module 16.

The management device 5 enables remote data communication between the security device 1 and the data storage arrangement 22 by providing an authorisation signal to the security device 1. When the security device 1 is authorised by the authorisation signal, remote data communication occurs between the security device 1 and the management device 5.

The security device 1 is configured, when authorised by the management device 5, to transmit data output from the communication port of the computer 2 to the management device 5 for storage within the storage arrangement 22 in the management device 5. The security device 1 is also configured to communicate data sent to the security device 1 from the storage arrangement 22 in the management device 5 to the computer 2. Data input and output from the communication port of the computer 2 is thus stored within the storage arrangement 22 in the management device 5 and not within the security device 1. The computer 2 mounts the disc image comprising the data which is stored at the management device 5 as if the data was stored in a mass storage device that is connected directly to the communication port of the computer 2. The security device 1 only permits the computer 2 to access the data when the security device 1 is authorised by an authorisation signal from the management device 5.

The data is stored securely within the management device 5 which is preferably in a secure location, such as a secure data centre. Consequently, if the security device 1 is removed from the computer 2, the data is not compromised since the data is not stored on the security device 1. Access to the data can also be restricted by the management device 5 if, for instance, the security device 1 is inserted into a different computer which the management device 5 detect as a computer which is not authorised to access the data.

In the preferred embodiment of the invention, the storage arrangement 22 in the management device 5 is an elastic storage arrangement. The elastic storage arrangement is configured to allocate a portion of the capacity of the storage arrangement 22 to match the required data capacity of the disc image 23. The elastic storage arrangement is configured to increase the allocated portion of the storage arrangement 22 if a larger disc image is required or to reduce the size of the portion of the storage arrangement 22 if a smaller capacity disc image is required.

The management device 5 is configured to adjust the size of the allocation for the disc image elastically in a secure manner by creating a new disc image of the correct size and synchronising the data between the two disc images. The data in the original disc image is only deleted by the management device 5 after the new disc image has been created successfully. The elastic storage arrangement in the management device 5 enables the system to set the size of the disc image available to the computer 2 at the remote management device 5. The system is therefore free from the constraints of a conventional mass storage device which only comprises a fixed capacity storage arrangement locally within the mass storage device.

The management device 5 comprises an anti-malware system which is configured to scan data for malware and, if malware is found, to quarantine any infected data file and/or remove the malware. The management device 5 is configured to scan data received at the management device 5 from the security device 1 before the data is stored in the storage arrangement 22. The anti-malware system in the management device 5 is operable to intercept any malware transmitted from the security device 1 to the management device 5 before the malware is stored by the management device 5.

The anti-malware system provided within the management device 5 is a centralised anti-malware system that scans data transmitted between the management device 5 and a plurality of security devices, such as the security device 1 described above. The definitions in the anti-malware system can be kept up to date easily since the anti-malware system is provided at a single central location which is either connected to the Internet to receive updates or readily accessible by a technician who can apply the updates manually. The management device 5 preferably operates using current hardware and software which is optimised to detect the latest strains of malware.

An embodiment of the invention enables a computer, such as an industrial control computer or an outdated computer system, which is not capable of running an anti-malware system to access data stored by the management device 5 which has already been scanned for malware by the anti-malware system in the management device 5. This minimises the possibility of the computer from being infected by malware via a communication port on the computer. The system of an embodiment of the invention is compatible with all computer systems since the disc image provided by the management device 5 via the security device 1 appears as a mass storage device which is connected directly to a communication port of a computer.

In one embodiment of the invention, the security device 1 and the management device 5 function as a clientless malware or virus detection system. The system is clientless in the sense that the system does not require specific software or hardware to be installed on a computer to enable the system to be used with the computer. In this embodiment, the security device 1 acts as a malware sensor or collector. When the security device 1 is connected to a communication port of a computer the security device 1 is able to be infected with malware from the computer.

In the event that the security device 1 is infected with malware from the client computer, the security device 1 communicates the malware files and/or other infected data files to the management device 5. The management device 5 scans the malware files and/or the infected data files and either disinfects quarantines the files. The management device 5 is preferably also configured to report details of the malware to a remote device for analysis. This embodiment of the invention is therefore configured to operate in a "honeypot" mode to collect malware files or infected data files for analysis.

In one embodiment of the invention, the management device 5 is configured to store a "whitelist" of data files that have been previously checked by the management device 5 and which are considered to be safe data files to be transmitted to a computer via a security device. The management device 5 is configured to transmit whitelisted data files to one or more security devices which are connected to communication ports of one or more computers.

The management device 5 of one embodiment of the invention is configured to provide a secure identifier or key with a whitelisted data file which confirms the authenticity of the whitelisted data file. For example, the management device 5 of one embodiment of the invention is configured to transmit a whitelisted firmware data file to a security device 1 together with a secure identifier that is used by the security device 1 to confirm the authenticity of the firmware data file.

The secure identifier is preferably encrypted to minimise the possibility of the content of the secure identifier being accessed and replicated by a malicious party. In one embodiment, the secure identifier comprises a cryptographic hash value that is generated based on the content of the whitelisted data file and subsequently encrypted.

In a further embodiment of the invention, the management device 5 is configured to store a "black list" of data files that must not be transmitted to a security device 1. The blacklisted files are, for instance, infected or problematic data files that might disrupt the security device 1 of the computer 2.

In another embodiment of the invention, the management device 5 is configured to provide an image file to the security device 1 which comprises a collection of data files that have been approved and preferably also whitelisted by the management device 5. The management device 5 is configured to generate a unique or substantially unique identifier for the image file which the management device 5 stores in association with the image file. In one embodiment, the management device 5 generates the unique identifier by performing data operations on the data of the image file. In another embodiment, the management device 5 encrypts the image file using an encryption key.

In one embodiment, the management device 5 is configured to provide a copy of the image file to a removable storage drive, such as a flash drive. In this embodiment, the security device 1 is provided with a removable drive connector to enable the removable storage drive to be connected to the security device 1 so that the security device 1 can access the image file.

When the removable storage drive is connected to the security device 1, the security device 1 performs a predetermined data operation on the image file to calculate the unique identifier for the image file. The security device 1 transmits the calculated unique identifier to the management device 5. The management device 5 checks the calculated unique identifier and either approves or rejects the calculated unique identifier.

If the management device 5 approves the calculated unique identifier then the management device 5 transmits an authorisation signal to the security device 1 which authorises the security device 1 to access the image file. The computer can then access the image file via the security device 1. If, on the other hand, the management device 5 rejects the calculated unique identifier then the management device 5 does not authorise the security device 1 to access the image file and the client computer is prevented from accessing the image file.

In embodiments in which the management device 5 encrypts the image file, the management device 5 transmits a decryption key to the security device 1 together with or instead of the authorisation signal. The security device 1 then uses the decryption key to decrypt the image file 1 for access by the computer.

Embodiments of the invention which enable files to be provided to the security device 1 via a removable storage drive instead of via a computer network are particularly well suited to applications where there is limited network bandwidth. This is because the bandwidth that is required to transmit the authorisation signal and/or the decryption key is significantly less than the bandwidth that would be required to transmit a whitelisted data file across the network. The system may therefore be used to provide whitelisted data files securely to a computer which is situated on a ship, oil rig or other location where network bandwidth is limited. The system is also well suited for use in systems, such as air traffic control systems, where it is desirable to limit data transfer across a computer network to only critical operational data.

The removable drive connector provides an additional benefit of enabling users to connect a removable storage drive to different security devices that are connected to different computers. The user does not need any specialist equipment or security information to enable the user to operate the different computers securely using the removable storage drive which provides access to the image file.

In a further embodiment of the invention, the security device 1 is configured to store a cache of files in the memory 15 that are provided to the security device 1 by the management device 5. The files are cached in the memory 15 to enable the files to be accessed immediately by the computer. This enables the security device 1 to provide the cached files to the computer when the network connection between the security device 1 and the management device 5 is limited or non-existent.

In this embodiment, the management device 5 is configured to transmit files to the security device 1 to be cached within the memory 15 when there is a reliable network connection between the security device 1 and the management device 5. The cached files are stored in an encrypted form within the memory 15 in the security device 1 and the security device 1 is configured to decrypt the files using a temporary session key which is generated by the management device 5. The temporary session key preferably only remains active while the security device 1 is powered up by a connection to the computer.

If the security device 1 is disconnected from the computer and powered down then the temporary session key expires and the encrypted cached files cannot be decrypted. If the security device 1 is subsequently inserted into a computer then the security device 1 is configured to establish a new temporary session key with the management device 5 and the data files must be re-cached into the memory 15 within the security device 1.

The cached file facility of an embodiment of the invention enables the security device 1 to function when there is limited or no network connectivity between the security device 1 and the management device 5, whilst still maintaining the security of the data by encrypting the cached files.

Referring again to FIG. 4 of the accompanying drawings, one embodiment of the invention incorporates at least two further security devices 24, 25 which are identical to the security device 1 described above. The further security devices 24, 25 are configured to communicate with the management device 5 as described above. The storage arrangement 22 in the management device 5 is configured to store a respective disc image 26, 27 for each of the further security devices 24, 25.

In the arrangement shown in FIG. 4, the further security devices 24, 25 are connected to communication ports of further computers 28, 29. The system is operable to protect each of the computers 2, 28 and 29 using the security devices 1, 24, 25 by storing the data to be accessed by the computers 2, 28 and 29 securely at the remote management device 5 where the data is scanned centrally for malware. The security devices 2, 28 and 29 prevent further devices from being connected to the communication port on the computer 2, 28 and 29 to which the security device 1, 24 and 25 is connected. Consequently, the security devices 1, 24 and 25 minimise the possibility of an infected mass storage device from being connected to the communication port.

In a preferred embodiment of the invention, a security device is attached to every communication port on a computer in order to prevent other devices from being connected to the communication ports. The system is operable to detect when one of the security devices is removed from the computer. The system alerts a technician to tampering or unauthorised use of a communication port on the computer to enable the technician to inspect the computer and to address any security issues quickly.

The monitoring system provided by an embodiment of the invention allows agent-less monitoring of the communication ports on a computer. Furthermore the monitoring data generated by the monitoring system 20 facilitates compliance reporting by recording the status of each security device in the system and the flow of information to and from each computer.

In a further embodiment of the invention, the security device is configured to set any memory stored within the security device to be read-only if the security device has not been authorised by the management device after a predetermined length of time.

In another embodiment of the invention, the security device 1 is configured for self-monitoring and configured to react to internal and/or external influence. External influences include but are not limited to the security device 1 being tampered with or unplugged from the communication port of the computer 2. Internal influences include but are not limited to the health of the security device 1 system and processes. In the event that the security device 1 detects external or internal influences, the security device 1 is configured to notify the management device 5 and/or take remedial action to rectify the issue within the security device 1.

In one embodiment, the security device 1 is a self-monitoring device which incorporates a power source, such as a battery, which is configured to power the security device 1 for a length of time after the security device 1 is disconnected from a computer. The power source can, for instance, provide enough power to wipe the security device 1 to prevent unauthorised use of the security device 1.

In the present specification "comprise" means "includes or consists of" and "comprising" means "including or consisting of".

The invention claimed is:

1. A security system for protecting a computer, the system comprising:
   a security device, and
   a remote management device which is configured to store data to be communicated to the security device, the remote management device being configured to store a whitelist of data files that are authorised for transmission to the security device and a secure identifier for each whitelisted data file which confirms the authenticity of the whitelisted data file, wherein the security device incorporates:
   a connection arrangement comprising a universal serial bus (USB), Firewire®, Ethernet, eSATA or Thunderbolt® connector which is configured to be connected to a universal serial bus (USB), Firewire®, Ethernet, eSATA or Thunderbolt® communication port of a computer,
   a communication module which is configured to communicate data between the security device and the remote management device, and
   a control unit which is configured to control remote data communication between the communication port of the computer and the remote management device via the connection arrangement and the communication module, wherein the control unit is configured to disable the remote data communication when the control unit is not authorised by a signal from the remote management device and the control unit is configured to enable the remote data communication in response to an authorisation signal received from the remote management device and to transmit whitelisted data files and a secure identifier for each whitelisted data file received from the remote management device to the communication port of the computer during the remote communication.

2. The system of claim 1, wherein the security device comprises a persistent memory storing machine readable instructions for execution by the control unit during the operation of the security device, and wherein the security device does not incorporate a mass storage device.

3. The system of claim 2, wherein the persistent memory stores machine readable instructions which, when executed by the control unit, function as an operating system which controls the security device.

4. The system of claim 2, wherein the persistent memory stores machine readable instructions which, when executed by the control unit, perform the function of a pre-execution environment (PXE) which obtains machine readable instructions stored on the remote management device which, when executed by the control unit, perform the function of an operating system which controls the security device.

5. The system of claim 2, wherein the security device is configured to prevent data which has not been authorised by the remote management device from being stored in a persistent memory in the security device.

6. The system of claim 1, wherein the remote management device is configured to provide an elastic data storage system which allocates a portion of the persistent data storage arrangement to store data to be communicated with the security device.

7. The system of claim 1, wherein the remote management device comprises a malware scanning module which is configured to scan data stored in the persistent data storage arrangement for malware.

8. The system of claim 1, wherein the remote management device comprises a monitoring arrangement which is configured to monitor the status of the security device.

9. The system of claim 8, wherein the monitoring arrangement is configured to periodically transmit a status request signal to the security device, the security device being configured, in response to the status request signal, to transmit a status signal to the monitoring arrangement which is indicative of a status of the security device.

10. The system of claim 8, wherein the monitoring arrangement is configured to generate an alert signal if the monitoring arrangement does not receive a status signal from the security device within a predetermined time period.

11. The system of claim 1, wherein the communication module is configured to encrypt data communicated to the remote management device and to decrypt data received from the remote management device.

12. The system of claim 1, wherein the security device is configured to at least partly switch off when the connection arrangement is disconnected from the communication port of the computer.

13. The system of claim 1, wherein the computer is a supervisory control and data acquisition (SCADA) system.

14. The system of claim 1, wherein the system comprises a plurality of security devices which are each configured to communicate with at least one remote management device.

15. The system of claim 14, wherein the system comprises a computer which incorporates a plurality of communication ports and one of the security devices is connected to each one of the plurality of communication ports.

16. A method of securing a computer which comprises at least one universal serial bus (USB), Firewire®, Ethernet, eSATA or Thunderbolt® communication port, the method comprising:
providing a security device and a remote management device,
storing, at the remote management device, a whitelist of data files that are authorised for transmission to the security device and a secure identifier for each whitelisted data file, wherein the security device incorporates:
a connection arrangement comprising a universal serial bus (USB), Firewire®, Ethernet, eSATA or Thunderbolt® connector which is configured to be connected to the universal serial bus (USB), Firewire®, Ethernet, eSATA or Thunderbolt® communication port of the computer,
a communication module which is configured to communicate data between the security device and the remote management device, and
a control unit which is configured to control remote data communication between the communication port of the computer and the remote management device via the connection arrangement and the communication module, connecting the connection arrangement of the security device to a communication port of the computer, wherein the method further comprises:
transmitting an authorisation signal from the remote management device to the security device, enabling the remote data communication at the security device in response to the received authorisation signal and transmitting whitelisted data files and a secure identifier for each whitelisted data file from the remote management device to the security device, and disabling the remote data communication when the security device is not authorised by a signal from the remote management device.

17. The method of claim 16, wherein the method further comprises providing a plurality of security devices and connecting each of the security devices to a respective communication port of the computer.

18. The method of claim 16, wherein the security device comprises a persistent memory storing machine readable instructions for execution by the control unit during the operation of the security device, and wherein the security device does not incorporate a mass storage device.

19. The method of claim 18, wherein the persistent memory stores machine readable instructions which, when executed by the control unit, function as an operating system which controls the security device.

20. The method of claim 18, wherein the persistent memory stores machine readable instructions which, when executed by the control unit, perform the function of a pre-execution environment (PXE) which obtains machine readable instructions stored on the remote management device which, when executed by the control unit, perform the function of an operating system which controls the security device.

21. The method of claim 18, wherein the method comprises preventing data which has not been authorised by the remote management device from being stored in a persistent memory in the security device.

22. The method of claim 18, wherein the method comprises allocating at least a portion of the persistent data storage arrangement to store data to be communicated with the security device in an elastic storage system at the remote management device.

23. The method of claim 18, wherein the remote management device comprises a malware scanning module and the method comprises scanning data stored in the persistent data storage arrangement for malware.

24. The method of claim 16, wherein the remote management device comprises a persistent data storage arrangement which is configured to store data to be communicated to the security device during the remote data communication.

25. The method of claim 16, wherein the method comprises encrypting data communicated to the remote management device and to decrypting data received from the remote management device.

26. The method of claim 16, wherein the remote management device comprises a monitoring arrangement and the method comprises monitoring the status of the security device using the monitoring arrangement.

27. The method of claim 26, wherein the method comprises periodically transmitting a status request signal from the monitoring arrangement to the security device, and transmitting a status signal from the security device in response to the status request signal to the monitoring arrangement which is indicative of a status of the security device.

28. The method of claim 27, wherein the method comprises generating an alert signal if the monitoring arrangement does not receive a status signal from the security device within a predetermined time period.

29. The method of claim 16, wherein the method comprises at least partly switching off the security device when the connection arrangement is disconnected from the communication port of the computer.

30. The method of claim 16, wherein the computer is a supervisory control and data acquisition (SCADA) system.

31. The method of claim 16, wherein the method comprises providing a plurality of security devices which are each configured to communicate with the remote management device.

32. The method of claim 31, wherein the method comprises connecting one of the security devices to each one of a plurality of communication ports provided on a computer.

33. The method of claim 16, wherein the method comprises presenting the stored data as a disc image to the security device during the remote data communication.

* * * * *